United States Patent [19]

Plee

[11] Patent Number: 5,132,260
[45] Date of Patent: Jul. 21, 1992

[54] ZEOLITE GRANULES WITH ZEOLITIC BINDER

[75] Inventor: Dominique Plee, Meulan, France

[73] Assignee: Ceca, S.A., Paris, France

[21] Appl. No.: 477,857

[22] PCT Filed: Jun. 15, 1989

[86] PCT No.: PCT/FR89/00300
§ 371 Date: Jun. 20, 1991
§ 102(e) Date: Jun. 20, 1991

[87] PCT Pub. No.: WO89/12603
PCT Pub. Date: Dec. 28, 1989

[30] Foreign Application Priority Data

Jun. 17, 1988 [FR] France .................. 88 08107

[51] Int. Cl.$^5$ .................. B01J 29/06; B01J 37/00
[52] U.S. Cl. .................................................. 502/64
[58] Field of Search .................................... 502/64

[56] References Cited

U.S. PATENT DOCUMENTS

| | | | |
|---|---|---|---|
| 2,865,867 | 12/1958 | Van Dyke et al. | 502/64 |
| 3,377,295 | 4/1968 | Pryor | 502/64 |
| 3,764,563 | 10/1973 | Minachev et al. | 502/64 |
| 4,528,276 | 7/1985 | Cambell et al. | 502/64 |
| 4,601,992 | 7/1986 | Derleth et al. | 502/64 |

FOREIGN PATENT DOCUMENTS 26923  2/1984  Japan .................. 502/64

Primary Examiner—Carl F. Dees

[57] ABSTRACT

A process for obtaining zeolite agglomerates for molecular sieves by forming a paste from a zeolite powder, a siliceous earth, and a sodium aluminate solution, shaping the paste into agglomerates, aging the agglomerates under ambient conditions, heat-treating, and then calcining the agglomerates and the resultant agglomerates.

8 Claims, No Drawings

ZEOLITE GRANULES WITH ZEOLITIC BINDER

TECHNICAL FIELD

The present invention pertains to a new procedure for obtaining granular zeolitic molecular sieves comprised uniquely of zeolitic compounds.

In the present context, the zeolitic molecular sieves are crystalline aluminosilicates of the general formula $$M_{2/n}O \cdot Al_2O_3 \cdot xSiO_2 \cdot yH_2O$$

in which M represents a cation of valence n, in which x represents 2 in the case of zeolites A and has values between 2 and 6 in the case of zeolites X or Y, in which y characterizes the hydration state of the zeolite, the value 0 corresponding to anhydrous zeolites (calcined).

The crystalline structure of these zeolites consists essentially of a three-dimensional framework of $SiO_4$ and $AlO_4$ tetrahedrons linked to each other by sharing an oxygen atoms. In the tetrahedral structure, the ratio of the number of oxygens to the total sum of the Si an Al atoms is thus 2. A structure formed entirely of $SiO_4$ tetrahedrons has a zero electric charge. Replacing $SiO_4$ tetrahedrons with $AlO_4$ tetrahedrons results in a negative charge which is compensated for by the inclusion of cations in the lattice. These cations can be exchanged with cations from aqueous solutions and the exchange techniques based on this property are well known by the expert in the field.

The geometry of the assembly of $SiO_4$ and $AlO_4$ tetrahedrons is such that the structure has cavities, refereed to as cages, separated by well-calibrated opening windows. At room temperature, these cages are ordinarily occupied by water. A suitable thermal treatment eliminates this water and releases a porous system.

Such zeolites have remarkable adsorption properties which originate, on the one hand, from the strength of the affinity that they develop for certain types of molecules and which make them an adsorption agent of choice, notably when it is desired to reach very low equilibrium pressures of the adsorbate and, on the other hand, a high selectivity associated with the narrow distribution of the micropores providing access to the cavities of the crystalline structure. These structures function as veritable molecular sieves, which is the origin of their common name. Because of these qualities, they are often preferred over older adsorbent agents such as silica gel, alumina and activated carbon.

Zeolites are conventionally obtained in the form of fine powders, whether they originate from natural deposits or industrial synthesis operations. For their employment as adsorption agents, they have to be put in the form of balls or granules by agglomeration, with the conventionally used binder being a clay mineral such as bentonite, kaolin or attapulgite. Other binders which have been proposed include aluminum hydroxide, silicic acid salts and siliceous earth.

The problem created by agglomeration results from the introduction into the granular adsorbent of a nonnegligible percentage of a phase which does not contribute anything to its adsorbent properties and which may even induce disastrous performances in certain applications (for example, bentonite catalyzes acid reactions such as, for example, the polymerization of olefins). Thus, for a long time it has been proposed to employ zeolitizable binders which would be activated after agglomeration is carried out.

PRIOR ART

The most common methods are based on the possibility of producing a zeolite A from metakaolin and sodium hydroxide under practically stoichiometric conditions.

Thus, U.S. Pat. No. 3,119,659 (Taggart et al.) sets forth a procedure for obtaining molecular sieve particles by agglomeration of zeolite A from kaolin and a sodium hydroxide solution, followed by calcination of the agglomerate, then crystallization in a sodium hydroxide solution. The method has the drawback of requiring double treatment of the agglomerate, first a high-temperature treatment required to transform the kaolin into metakaolin, which is the reactive form, then a recrystallization in sodium hydroxide.

Attempts have been made to replace the kaolin with metakaolin in the preparation of the extrudate, as in the procedures described in U.S. Pat. No. 4,381,255 (Nozemack et al.) and U.S. Pat. No. 4,381,26 (Hildebrandt), or with a mixture of amorphous silica as the silica source and sodium aluminate as the aluminum source, as in Patent No. DE 25 24484 (Grace), to cause advancement of the crystallization of the product during the intermediate phase of aging, and to treat the aged extrudate with a dilute, hot solution of sodium hydroxide in order to complete the crystallization begun in the preceding step. It has also been attempted, as in French Patent No. 1,419,426 (Farb. Bayer Akt.) to employ a silicic acid earth gelled with magnesium oxide, with the zeolitization of the binder being obtained by hot aging in a sodium aluminate solution.

These diverse methods have in common the defect of requiring the delicate realization of multiple steps in series. In certain cases, an intermediate calcination is necessary so that the agglomerate will not separate during the subsequent wet phase. It is also necessary to wash the extrudates after treatment in order to remove the excess of sodium hydroxide or sodium salts, substances which end up causing deposits to form on the equipment; these operations are time consuming and difficult, reducing the cost effectiveness of the procedure.

PRESENTATION OF THE INVENTION

The present invention, which resolves these drawbacks, is a procedure for obtaining zeolites, notably zeolites A, with a binder comprised of a zeolitic phase, also of type A, and which includes the following successive operations:

formation of a paste of zeolite powder from siliceous earth and an aqueous solution formed by dissolving hydrated alumina in the presence of sodium hydroxide;

conversion into mechanical form of the paste by means of extrusion, compression or any other appropriate means for producing an agglomerate;

aging the agglomerate at room temperature;

thermal treatment of the agglomerate between 50° and 100° C.;

calcination of the agglomerate between 450° and 600° C.

One generally employs siliceous earths containing between 20 to 40% by weight of $SiO_2$ and, preferentially, siliceous earths containing 30% of $SiO_2$. In the pastes according to the invention, the weight ratio between the silica provided by the siliceous earth and the zeolite is between approximately 4 and 15% (these proportions being expressed on the basis of the finished product after calcination at 900° C.), or 12.5 to 60% of siliceous earth containing 30% of [$SiO_2$] in relation to the calcined mass. The sodium aluminate solution introduces into the paste amounts of aluminum hydroxide which can range between 0.2 g and 1.6 g of $Al(OH)_3$ and amounts of sodium hydroxide between 0.1 g and 0.9 g of NaOH per gram of silica $SiO_2$ provided by the siliceous earth; these are values which one can compare to the stoichiometric quantities for forming zeolite A and which are, respectively, 1.29 g of aluminum hydroxide and 0.66 g of sodium hydroxide per gram of $SiO_2$. Outside of the limits of composition indicated above, it is not possible to obtain a molecular sieve free from non-zeolitic binder possessing adsorption properties which are improved in comparison to those of conventional agglomerates comprise of 80% zeolite and 20% inert binder.

To prepare the paste in accordance with the invention, one starts by mixing in the dry state the zeolite powder with an extrusion agent such as carboxymethyl cellulose. The mixing is continued and the siliceous earth is added, followed by addition of the sodium hydroxide solution of sodium aluminate, which has been freshly prepared but brought to room temperature. The consistency of the paste is adjusted by addition of water in a suitable amount such that its water content, including the water of hydration of the zeolite, is between 60 and 75% (expressed in weight % in relation to the group of anhydrous constituents $SiO_2$, $Al_2O_3$, $Na_2O$ and zeolite, i.e., in relation to the mass of the granulate after calcination at 900° C.). This paste is then extruded to obtain threads, preferably with a diameter from 1.6 to 3.2 mm; one can also agglomerate the paste into balls using a granulation disk, or compress it according to techniques which are well known to the expert in the field. These extrudates are subjected to spontaneous aging at room temperature and humidity for up to 24 hours and then baked between 50° and 150° for between approximately 30 minutes and 24 hours; finally, they are calcined at a temperature of at least 450° C., without exceeding 600° C., for 30 minutes to 6 hours.

Compared to the known procedures, the procedure in accordance with the invention has the advantage of great simplicity and quickness in the binder zeolitization operations which can be carried out in an in-line manner; these operations are effected with safety in the dry phase, and there is no requirement of a preliminary gelling of the siliceous earth with magnesia, nor of recrystallizing the agglomerates in a basic solution after forming them, nor, above all, of washing them after zeolitization; in addition, with the absence of any excess of basic agent, one avoids the effect of restriction of opening of the zeolite pores, which is obviously damaging to its adsorption qualities and, at the same time, the problems of handling more or less sticky agglomerates are eliminated; the problems of corrosion of the equipment are also minimized.

The granular molecular sieves obtained in accordance with this procedure offer an adsorption kinetics, a water-adsorption capacity greater than 20%, a mechanical resistance to crushing equal to or greater than $6 \times 10^5$ Pascals, better than that of sieves agglomerated with traditional binders. They will have advantageous applications notably in petrochemistry, for air conditioning in cars and as desiccants in insulating double windows.

The present invention is not limited to type A molecular sieves. Transfer, notably to zeolites X and Y, could be accomplished by the specialist in the field.

METHODS FOR REALIZING THE INVENTION

Example 1

One prepares 200 mL of a solution containing 30 grams of sodium hydroxide NaOH, taken in the form of flakes or liquor, the solution is brought to a boil and 50 g of hydrated alumina are gradually dispersed in it. Once the clear solution of sodium aluminate is obtained, it is brought up to 200 mL and then allowed to cool at room temperature.

In addition, one mixes for 10 minutes, in a Fischer mixing mill, 800 g of zeolite 4A powder (weight computed in equivalent of pounds of zeolite calcined at 900° C.), 25 g of carboxymethyl cellulose and 150 g of siliceous earth containing 30% by weight [of $SiO_2$].

Once this paste is obtained, one adds the sodium aluminate solution and 80 g of water under agitation. After 0 minutes of mixing, the paste is extruded in a Pinette-type hydraulic press, the base of which is comprised of an extruder, the holes of which have a diameter of 3.2 mm.

. The extrudates are then placed in an oven at 100° C. for one hour, then activated at 550° C. for two hours.

Their water-adsorption capacity, measured by equilibration for 24 hours in a chamber in the presence of an atmosphere with 10% relative humidity, is 23.7%, which indicates a noteworthy conversion to zeolite 4A (ordinary extruded agglomerates with 20% binder adsorb approximately 19.5% water under the same conditions).

Their mechanical resistance to deformation is $7 \times 10^5$ Pascals with a standard deviation of 0.7.

Example 2

Following the procedure of Example 1, one prepares a sodium aluminate solution but, this time, the amounts of sodium hydroxide and alumina contained in this solution are 20 g and 40 g, respectively.

One mixes in a mixing mill 800 g of zeolite 4A powder (weight equivalent to the material calcined at 900° C.), 25 g of carboxymethyl cellulose and 150 g of siliceous earth containing 30% by weight [of $SiO_2$] for 10 minutes.

One then introduces the cooled aluminate solution and 120 mL of water; the mixing is continued for 10 minutes.

Extrusion is carried out using the Pinette hydraulic press with an extruder diameter of 3.2 mm.

The extrudates are then placed in an oven at 60° C. for 16 hours and calcined at 550° C. for 2 hours. The water adsorption capacity, measured under the same conditions as in Example 1, is 24.5% and the mechanical resistance to deformation is $6.2 \times 10^5$ Pascals with a standard deviation of 1.4.

Example 3

This example pertains to the preparation of sieve extrudates without binder, using an aluminate solution that is more concentrated in sodium hydroxide and alumina than the solution employed in Examples 1 and 2; in addition, the proportion between sodium hydroxide and alumina is almost stoichiometric.

Following the procedure of Example 1, one prepares a sodium aluminate solution containing 40 g of sodium hydroxide and 70 g of alumina.

Using a mixing mill, one mixes 800 g of zeolite 4A powder (weight equivalent to the material calcined at 90° C. sic., 900° C.), 25 g of carboxymethyl cellulose and 150 g of siliceous earth containing 30% by weight [of $SiO_2$] for 10 minutes.

One then introduces the alumina solution and 100 mL of water; the mixing is continued for 10 minutes.

Extrusion is carried out using the Pinette hydraulic press with a diameter of 3.2 mm.

The extrudates are then placed in an oven at 100° C. for 16 hours and then calcined for 2 hours at 550° C.

The water adsorption capacity, measured under the same conditions as in Example 1, is 20.6% and the mechanical resistance to deformation is $6.5 \times 10^5$ with a standard deviation of 1.3.

Example 4

Following the procedure of Example 1, one prepares a sodium aluminate solution. The amounts of sodium hydroxide and alumina contained in this solution are 30 and 40 g, respectively.

One mixes 800 g of zeolite 4A powder (weight equivalent to the material calcined at 900° C.), 20 g of carboxymethyl cellulose and 300 g of siliceous earth containing 30% [of $SiO_2$] for 10 minutes.

One adds the sodium aluminate solution and the mixing is continued for 10 minutes.

The paste is extruded using the Pinette hydraulic press equipped with a 3.2 mm diameter extruder. The extrudates are aged at room temperature for 24 hours, then placed in an oven at 100° C. for 2 hours and then calcined at 550° C. for 2 hours.

The water-adsorption capacity, measured under the conditions of Example 1, is 24.5% and the mechanical resistance to deformation is $5 \times 10^5$ Pascals with a standard deviation of 1.4.

Example 5

This example differs from Example 4 in that it pertains to the preparation of sieve extrudates without binder from a sodium aluminate solution containing more sodium hydroxide and alumina.

Following the procedure in Example 1, one prepares a sodium aluminate solution containing 80 g of sodium hydroxide and 100 g of alumina.

Using a mixing mill, one mixes 800 g of zeolite 4A powder (weight equivalent to the material calcined at 900° C.), 20 g of carboxymethyl cellulose and 300 g of siliceous earth containing 30% by weight [of $SiO_2$] for 10 minutes.

One then introduces the alumina solution and 100 mL; the mixing is continued for 10 minutes.

Extrusion is carried out using the Pinette hydraulic press equipped with a 3.2 mm diameter extruder.

The threads are treated in an oven for 1 hour at 100° C. and then activated at 550° C. for 2 hours. The water adsorption capacity, measured according to the procedure of Example 1, is 19.5% and the mechanical resistance to deformation is $9 \times 10^5$ Pascals with a standard deviation of 3.

Example 3

Following the procedure of Example 1, one prepares a sodium aluminate solution containing 30 g of sodium hydroxide and 60 g of alumina. These amounts correspond practically to the stoichiometry between the sodium hydroxide and the alumina.

Using a mixing mill, one mixes 800 g of zeolite 4A powder (weight equivalent to the material calcined at 900° C.), 20 g of carboxymethyl cellulose and 300 g of siliceous earth containing 30% by weight [of $SiO_2$] for 10 minutes.

One adds the sodium aluminate solution and 130 mL of water; the mixing is continued for 10 minutes.

The paste is extruded using the Pinette hydraulic press equipped with a 3.2 mm diameter extruder. The threads are left for 2 hours at 100° C. in an oven and then calcined at 550° C. for 2 hours.

The water adsorption capacity, measured according to the procedure of Example 1, is 23.1% and the mechanical resistance to deformation is $6.4 \times 10^5$ Pascals with a standard deviation of 1.7.

Example 7

This example differs from the preceding in the amount of siliceous earth added to the paste; the molar ratios between the alumina, sodium hydroxide and the silica originating from the siliceous earth were kept constant.

The preparation of the sodium aluminate solution is identical to that of Example 1 but this solution contains 45 g of sodium hydroxide and 90 g of alumina.

Using the mixing mill, one mixes for 10 minutes 800 g of zeolite 4A powder (weight equivalent to the material calcined at 900° C.), 20 g of carboxymethyl cellulose and 450 g of siliceous earth containing 30% by weight [of $SiO_2$].

The sodium aluminate solution and 100 mL of water are introduced and the mixing is continued for 10 minutes.

The paste is extruded with the Pinette hydraulic press equipped with a 3.2 mm diameter extruder.

The extrudates are allowed to age for 16 hours in an oven at 60° C. and then are calcined at 550° C. for 2 hours.

The water adsorption capacity, measured according to the procedure of Example 1, is 22.6% and the mechanical resistance to deformation if $4 \times 10^5$ Pascals with a standard deviation of 1.3.

I claim:

1. A process for obtaining a zeolite agglomerate with zeolitized binder, comprising the following steps:
   (a) forming a paste of a zeolite powder with a siliceous earth and an aqueous solution formed by dissolving hydrated alumina in the presence of sodium hydroxide;
   (b) forming the paste into an agglomerate;
   (c) aging the agglomerate at room temperature; thermally treating the agglomerate between 50° and 100° C.; and
   (e) calcining the agglomerate between 450° and 600° C.

2. The process for obtaining zeolite agglomerates in accordance with claim 1, characterized in that the amount of siliceous earth employed is such that the silica $SiO_2$ provided by the siliceous earth is between 4 and 15% by weight of the mass of the final agglomerate, this being expressed as the produce mass after calcination (at constant weight) at 900° C.

3. The process for obtaining zeolite agglomerates in accordance with claim 1, characterized in that the aqueous solution obtained by dissolving hydrated alumina in the presence of sodium hydroxide contains sodium hydroxide NaOH in the amount of 0.1 to 0.9 g and hydrated alumina in the amount of 0.2 to 1.6 g per g of SiO$_2$ contained in the siliceous earth, and that the sodium hydroxide NaOH and the hydrated alumina are present in a weight ratio between 0.5 and 0.8.

4. The process for obtaining zeolite agglomerates in accordance with any one of claims 1 to 3, characterized in that the paste contains 60 to 75% of water by weight of the mass of the final agglomerate, this being expressed as the mass of the product after calcination (at constant weight) at 900° C.

5. The process for obtaining zeolite agglomerates in accordance with claim 1, characterized in that the duration of the aging at room temperature is at most equal to 24 hours.

6. The process for obtaining zeolite agglomerates in accordance with claim 1, characterized in that the thermal treatment between 50° and 150° C. is applied during a time period between 30 minutes and 24 hours.

7. The process for obtaining zeolite agglomerates in accordance with claim 1, characterized in that the calcination between 450° and 600° C. is effected for a time period between 30 minutes and 6 hours.

8. Zeolite agglomerates constituted of zeolite A, and a zeolitized binder obtained by the process of any one of claims 1 to 3 or 5 to 7.

* * * * *

UNITED STATES PATENT AND TRADEMARK OFFICE
CERTIFICATE OF CORRECTION

PATENT NO. : 5,132,260
DATED : July 21, 1992
INVENTOR(S) : Plee, Dominique

It is certified that error appears in the above-indentified patent and that said Letters Patent is hereby corrected as shown below:

Column 6, line 54, claim 1, before "thermally" insert -- (d)- -.

Signed and Sealed this

Fourteenth Day of September, 1993

Attest:

BRUCE LEHMAN

Attesting Officer        Commissioner of Patents and Trademarks